United States Patent
Knaack

Patent Number: 5,930,176
Date of Patent: *Jul. 27, 1999

[54] MULTIPLE WORD WIDTH MEMORY ARRAY CLOCKING SCHEME

[75] Inventor: Poland T. Knaack, Starkville, Miss.

[73] Assignee: Cypress Semiconductor Corp., San Jose, Calif.

[*] Notice: This patent is subject to a terminal disclaimer.

[21] Appl. No.: 09/013,499

[22] Filed: Jan. 26, 1998

Related U.S. Application Data

[63] Continuation of application No. 08/559,983, Nov. 17, 1995, Pat. No. 5,712,820.

[51] Int. Cl.⁶ .................................................. G11C 7/00
[52] U.S. Cl. .................... 365/189.02; 365/219; 365/221; 365/236
[58] Field of Search ............................. 365/189.02, 191, 365/219, 221, 230.02, 230.03, 236

[56] References Cited

U.S. PATENT DOCUMENTS

| | | | |
|---|---|---|---|
| 4,467,443 | 8/1984 | Shima | 395/416 |
| 4,802,122 | 1/1989 | Auvinen et al. | 365/154 |
| 4,839,866 | 6/1989 | Ward et al. | 365/221 |
| 4,864,543 | 9/1989 | Ward et al. | 365/221 |
| 4,875,196 | 10/1989 | Spaderna et al. | 365/238 |
| 4,891,788 | 1/1990 | Kreifels | 365/49 |
| 4,985,867 | 1/1991 | Ishii et al. | 365/221 |
| 5,084,837 | 1/1992 | Matsumoto et al. | 395/250 |
| 5,088,061 | 2/1992 | Golnabi et al. | 365/189.01 |
| 5,200,925 | 4/1993 | Morooka | 365/219 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 365/221 |
| 5,265,063 | 11/1993 | Kogure | 365/233 |
| 5,305,253 | 4/1994 | Ward | 365/73 |
| 5,311,475 | 5/1994 | Huang | 365/221 |
| 5,317,756 | 5/1994 | Komatsu et al. | 395/800 |
| 5,333,294 | 7/1994 | Schnell | 395/846 |
| 5,345,419 | 9/1994 | Fenstermaker et al. | 365/189.04 |
| 5,367,486 | 11/1994 | Mori et al. | 365/189.05 |
| 5,375,092 | 12/1994 | Taniguchi et al. | 365/221 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,490,257 | 2/1996 | Hoberman et al. | 395/427 |
| 5,506,809 | 4/1996 | Csoppenszky et al. | 365/221 |
| 5,506,815 | 4/1996 | Hsieh et al. | 365/230.03 |
| 5,513,318 | 4/1996 | van de Goor et al. | 395/185.01 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |
| 5,682,356 | 10/1997 | Knaack | 365/236 |
| 5,712,820 | 1/1998 | Knaack | 365/189.02 |

FOREIGN PATENT DOCUMENTS

| | | | |
|---|---|---|---|
| 1-113996 | 8/1989 | Japan | G11C 17/00 |
| 6-76559 | 6/1994 | Japan | G11C 7/00 |

*Primary Examiner*—Son Mai
*Attorney, Agent, or Firm*—Christopher P. Maiorana; Maiorana & Acosta, P.C.

[57] ABSTRACT

A circuit for distributing data from a common input source to a number of individual memory cells in a memory array. A multi-bit counter is used to distribute a timing signal to a number of decoder blocks. Each of the decoder blocks receives both a data input signal and the timing signal at all times. When a particular timing signal is present at a given decoder, the input signal containing a fixed width data word is passed through to the corresponding memory array for storing the data word. The present invention reduces the number of internal signal lines necessary to implement the control function and significantly reduces the chip area needed to generate the signal lines.

20 Claims, 2 Drawing Sheets

MULTIPLE WORD WIDTH MEMORY ARRAY CLOCKING SCHEME

This is a continuation of U.S. patent application Ser. No. 08/559,983, U.S. Pat. No. 5,712,820, filed Nov. 17, 1995.

FIELD OF THE INVENTION

This invention relates to FIFO buffers generally and more particularly to a clocking scheme for allowing a contiguous memory array to be used with various width data words.

BACKGROUND OF THE INVENTION

It is well known to construct a first-in first-out (FIFO) buffer or memory array that reads various size data words. The prior art required a shift register scheme to generate a number of intermediate signals necessary to incorporate a fixed word width data pack into the memory array. To implement a clocking scheme that stores fixed width data words that are equal to the width of the individual cells in the FIFO buffer, a 16-bit multiplexer would be required. To extend the prior art scheme to a memory array that is twice as wide as the width of the input data word, a 32-bit shift register would be required. Specifically, a 32-bit shift register would be necessary for a 9-bit word design and a 6-bit shift register would be required for a 18-bit word design. The prior art did not allow a single decode block to be used for both the 9-bit and 18-bit devices. The prior art FIFO's used a "carousel" type data placement scheme that used a 16-bit shift register to directly control each of the section signals. To extend the prior art system to decode both a 9-bit and 18-bit word would require a 32-bit shift register. The implementation of a 32-bit shift register would cause extreme difficulty in routing the various signals to appropriately connect the outputs of the shift register to each of the section control blocks. The implementation of a 32-bit shift register would also consume more than twice the amount of chip area that a 16-bit shift register would consume.

Referring to FIG. 1, a prior art scheme is shown generally comprising a shift register 12, a set of multiplexers 14a, 14b, 14c and 14d and a set of memory arrays 16a, 16b, 16c and 16d. A single data input 18 presents an input to each of the multiplexers 14a–d. The 16-bit shift register 12 presents one of a set of control inputs 20a, 20b, 20c and 20d to each of the multiplexers 14a–d. When the control input 20a–d is present at the multiplexer 14a–d, the data input 18 is received and is presented to the appropriate memory array 16a–d. An individual control input 20a–d is required for each memory array 16a–d. As the number of memory arrays 16a–d increases, the number of control inputs 20 will also increase. Each of the select inputs 20a–d would need to be individually routed from the individual multiplexers 14a–d to the shift register 12. The routing necessary to appropriately connect the control inputs 20a–d between the shift register 12 and the multiplexers 14a–d increases. To expand the shift register 12 to a 32-bit shift register would require twice the amount of routing as well as an increased amount of chip real estate to implement the shift register 12. The increase in routing the control inputs 20a–d and the increased chip area makes the prior art scheme difficult to implement with multiple width data words.

SUMMARY OF THE INVENTION

The present invention provides a circuit for distributing data from a common input source to a number of individual memory cells in a memory array. The present invention uses a multi-bit counter to distribute a timing signal to a number of decoder blocks. Each of the decoder blocks receives both a data input signal and the timing signal at all times. When a particular timing signal is present at a given decoder, the input signal containing a fixed width data word is passed through to the corresponding memory array for storing the data word. The present invention reduces the number of internal signal lines necessary to implement the control function.

Objects, features and advantages of the present invention are to provide a control circuit for distributing data to a number of memory arrays for use with both synchronous and asynchronous FIFO's as well as other memory devices. The circuit produces the distributing effect using a minimum number of signal lines, eliminates the need to use a wide bit shift register, can be adapted very easily to larger or smaller memory organization systems with minimum design changes, consumes less overall chip real estate and can easily be adapted to denser and wider memory devices with multiple data input word widths.

BRIEF DESCRIPTION OF THE DRAWINGS

These and other objects, features and advantages of the present invention will be apparent from the following detailed description and the appended claims in which:

DETAILED DESCRIPTION OF THE PREFERRED EMBODIMENT

Figure 1:
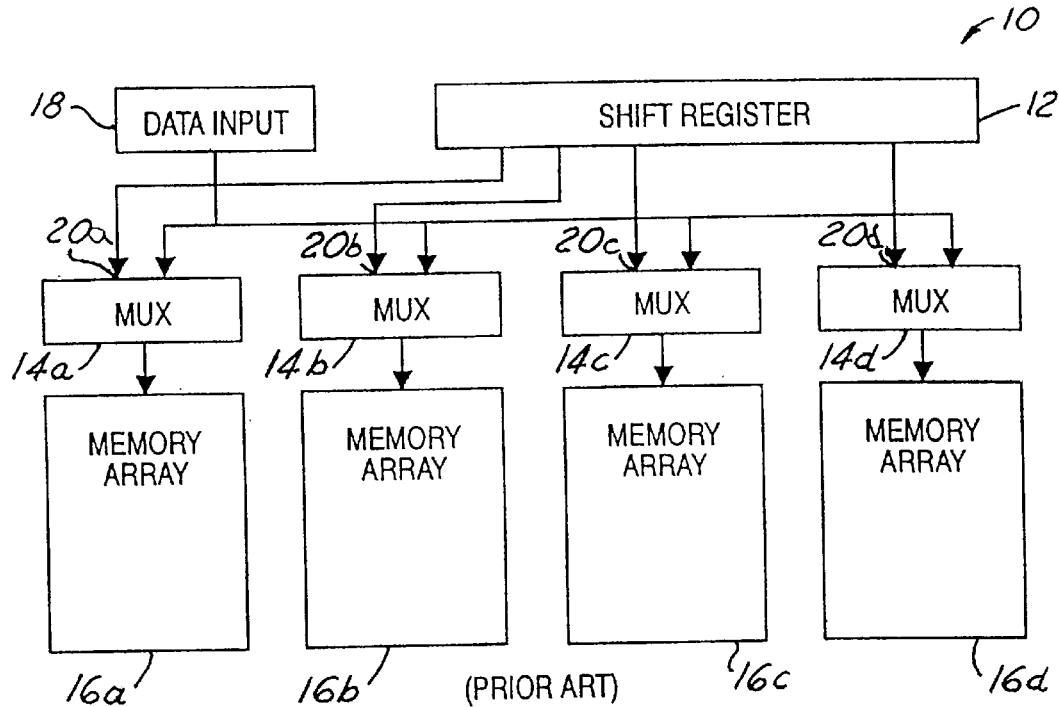
FIG. 1 is a block diagram of a prior art scheme.
Figure 2:
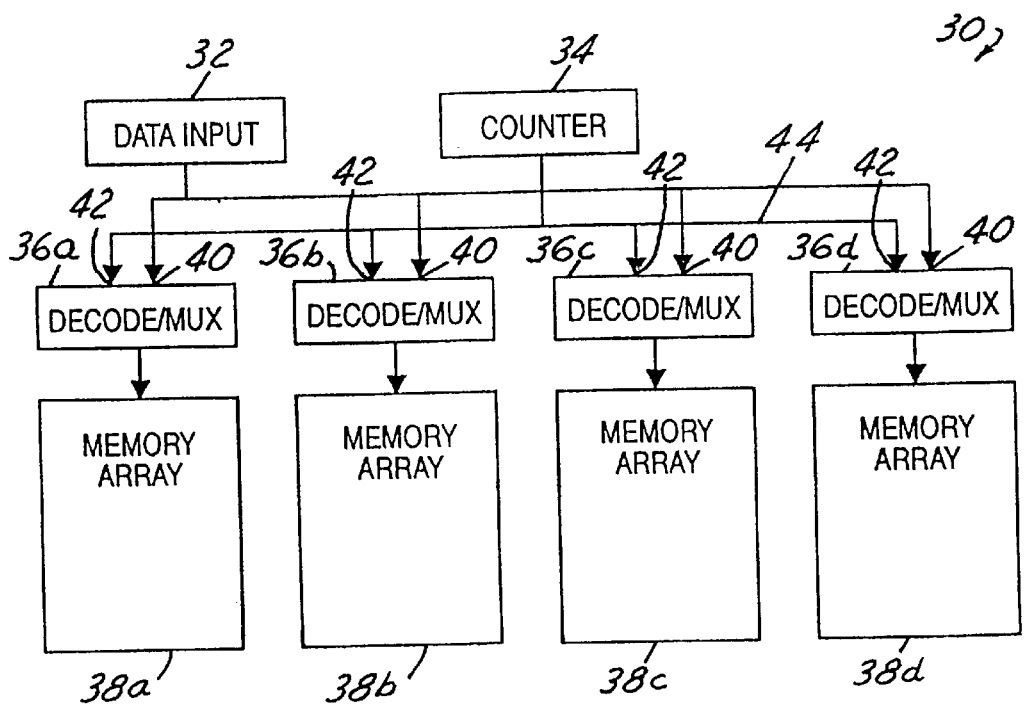
FIG. 2 is a block diagram of the presently preferred embodiment of the invention.

Referring to FIG. 2, a block diagram of a clocking circuit 30 is shown in accordance with a presently preferred embodiment of the invention. The clocking circuit 30 generally comprises a data input 32, a counter 34, a set of decoder and multiplexers 36a, 36b, 36c and 36d and a memory array 38a, 38b, 38c and 38d. Each of the decoder and multiplexer blocks 36a–36d have a signal input 40 and a timing input 42. The signal input 40 of each of the decoder and multiplexer blocks 36a–36d is received from the data input 32. As a result, each of the decoder and multiplexer blocks 36a–36d receive the signal input 40 at all times. The signal input 40 comprises a stream of fixed width data words that can be either a single bit serial input or a multi-bit parallel input. While each of the decoder and multiplexer blocks 36a–36d will receive the signal input 40 at all times, only certain specific decoder and multiplexer blocks 36a–36d present an output to the corresponding memory array 38a–38d at any given time. The decoder and multiplexer block 36a–36d that presents data to the corresponding memory array 38a–38d at a particular time is determined by a signal present at the timing input 42. The timing input 42 receives a timing signal from a timing bus 44 connected to the counter 34. Each of the decoder and multiplexer blocks 36a–36d receive the timing signal at the timing input 42 at all times. The counter 34 produces the timing signal that is a unique multi-bit digital word that changes with each clock cycle. A 4-bit counter 34 produces a 4-bit digital word that produces 2 to the 4th, or 16, unique states. A 5-bit counter produces a 5-bit digital word that produces 2 to the 5th, or 32, unique states. As a result, the addition of a single bit to the counter 34 and the bus 44 doubles the capabilities of the clocking circuit 30. Each unique state produced by the counter provides a specific timing signal that only certain specific decoder and multiplexer blocks 36a–36d will respond.

A specific example of a particular implementation of the present invention will be described where the memory arrays 38a–d are 9-bit devices and the data input signal 32 is a stream of 9-bit digital words. When a first word is presented by the decoder and multiplexer block 36a to the memory array 38a, the decoder and multiplexer blocks 36b, 36c and 36d connected to the memory arrays 38b, 38c and 38d have a timing signal present at the timing inputs 42 and a stream of digital words present at the signal input 40, but do not present the stream of digital words to the memory arrays 38b, 38c and 38d. When the first digital word is completely loaded through the decoder and multiplexer block 36a to the memory array 38a, the timing signal will continue to be present at the timing input 42. The timing signal will then change and be recognized at the timing input 42 of the decoder and multiplexer block 36b connected to the memory array 38b. At this point, a second digital word from the data input 32 will be loaded into the decoder and multiplexer block 36b connected to the memory array 38b. The decoder and multiplexer blocks 36a, 36c and 36d connected to the memory arrays 38a, 38c and 38d will not present the second digital word to the memory arrays 36a, 36c and 36d during this time. A similar input word loading is accomplished when the memory arrays 38c and 38d are loaded.

It should be appreciated that each of the memory arrays 38a, 38b, 38c and 38d have a corresponding decoder and multiplexer block 36a, 36b, 36c and 36d. Each of the decoder and multiplexer blocks 36a–36d recognize only a specific multi-bit timing signal present at the timing input 42. Only one of the decoder and multiplexer blocks 36a–36d recognizes the specific multi-bit timing word at any given clock cycle and processes the digital word present at the signal input 40. Effectively, each of the decoder and multiplexer blocks 36a–36d act as a digital valve. The digital valve effect of the decoder and multiplexer block 36 effectively opens when the proper multi-bit timing word is present at timing input 42, presenting an output to the appropriate memory array 38a–38d. Each of the decoder and multiplexers 36a–36d work in combination to completely load a digital word to one of the memory arrays 38a–38d on a given clock cycle before the next digital word from the data input 32 is loaded into the next appropriate memory array 38a–38d at the next clock cycle. The order of the loading of the memory arrays 38a–38d can be any order necessary to fit the particular design criteria of a given application. The sequential loading of memory array 38a, then 38b, then 38c, etc. is for illustrative purposes only.

The example illustrated using the 9-bit memory arrays 38a–d and the 9-bit digital words as the input signal 32 has a one word per timing signal organization. In an application where the width of the digital word is a multiple of the width of the memory arrays 38a–d, each fraction (i.e., one half, one third, one fourth, etc.) of the digital word would be loaded into a separate one of the memory arrays 38a–d on each clock cycle. As a result, the present invention would load a multi-width digital word into the memory arrays 38a–38d.

It is generally advantageous for a manufacturer to produce the smallest number of components necessary to maintain all product lines in current production. As a result, from a practical aspect, the present invention would be implemented using a counter 34 that is five-bits wide for all applications that require either 16 unique states or 32 unique states. If only 16 unique states are required for a particular design application, only four of the bits on the counter would be used with one of the bits being disabled. For example, the most significant bit would be disabled if the counter 34 was implemented as an up counter. Other counters could be used that produce a unique state at each clock cycle, such as a random counter. The approach of providing additional bits in the counter 34 is practical since the addition of an additional counter output signal line would be less expensive than producing two separate parts. In contrast, the prior art presently uses a 32-bit shift register which is far more difficult to manufacture than a 16-bit shift register. To maintain a single component using the prior art techniques, the much more complex 32-bit shift register would have to be produced on each device, even if only a 16-bit shift register portion is actually used.

Figure 3:
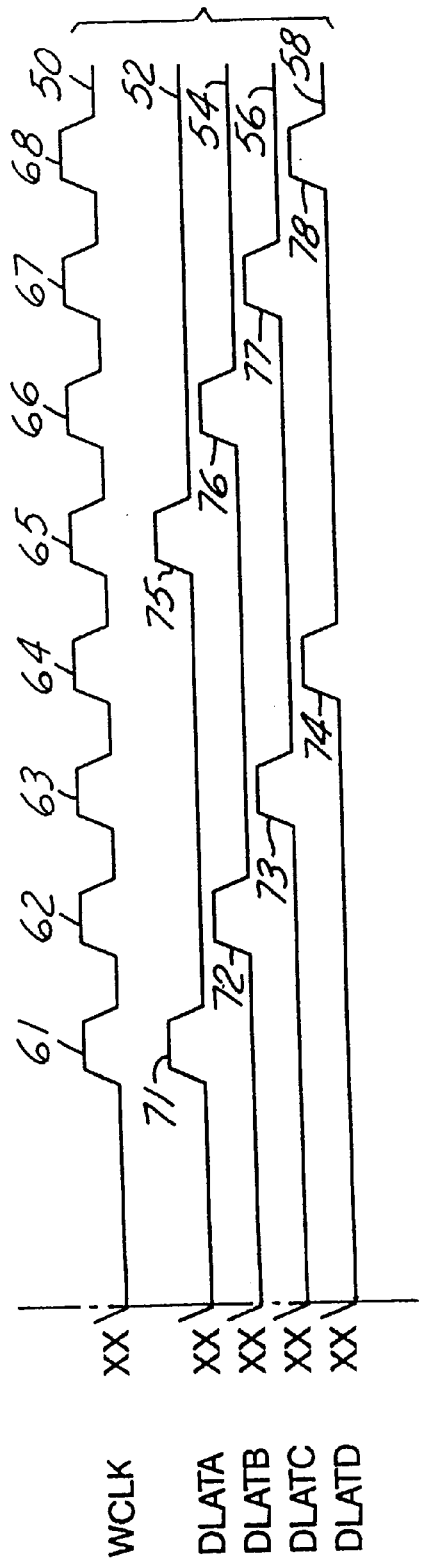
FIG. 3 is a timing diagram illustrating the effect of the present invention using a 9-bit data word.

Referring to FIG. 3, a timing diagram illustrating the functioning of the present invention when operating with a series of 9-bit data words as an input is shown. It should be appreciated that the example illustrated in FIG. 3 uses a 9-bit digital word for illustrative purposes only. Any fixed width digital word, including a single bit word, could be used without departing from the spirit of the invention. FIG. 3 generally comprises a Wclk signal clock 50, a dlatA signal 52, a dlatB signal 54, a dlatC signal 56 and a dlatD signal 58. The dlatA, dlatB, dlatC and dlatD signals provide pulses that represent when a word is loaded into a corresponding memory array 38a–38d. The digital high portions of the Wclk clock 50 are shown as pulses 61, 62, 63, 64, 65, 66, 67 and 68.

When the Wclk clock 50 is high at pulse 61, the dlatA signal 52 is shown as being high at a pulse 71. This loads a full 9-bit digital word into the memory array 38a. When the Wclk clock 50 is high at the pulse 62, the dlatB signal 54 is shown having a pulse 72. When the Wclk clock 50 is shown as being high at the pulse 63, the dlatC signal 56 is shown as being high at a pulse 73. Similarly, when the Wclk clock 50 is shown as being high at the pulse 64, the dlatD signal 58 is shown as being high at a pulse 74. The pulses 71, 72, 73 and 74 represent the loading of a 9-bit digital word to a respective one of the memory arrays 38a, 38b, 38c and 38d. After the dlatD signal 58 receives an input shown as the pulse 74, the next data word is loaded into memory array 38a when the dlatA signal 52 is high at a pulse 75. A similar effect is shown with a pulse 76, a pulse 77 and a pulse 78. A direct relationship is shown where a single word is written to the memory array 38a, then a single digital word is written to the memory array 38b, then a single digital word is written to the memory array 38c and finally a single digital word is written to the memory array 38d. After the digital word is written to the memory array 38d, the process starts again with writing a digital word to the memory array 38a.

It should be appreciated that the number of memory arrays 38a–38d is shown to be four for illustrative purposes only. The number of memory arrays 38a-d can be extended to any number of memory arrays desired for a particular design application or can be reduced to a single memory array. Increasing or decreasing the number of memory arrays would only require replacing the counter 34 with a counter having a sufficiently wide bit path to provide a sufficient number of independent states to accommodate the number of words written into the number of memory arrays 38a–d that are implemented. The width of the bit path would be determined by the width of the digital word, the width and number of the memory arrays 38a–d and the desired order of the loading of the memory arrays 38a–d. To accommodate these adjustments, the width of the bit path may have to be increased, decreased or left unchanged. The order of the loading of the memory arrays 38a–38d can be any order necessary to fit the particular design criteria of a given application. The sequential loading of memory array 38a, then 38b, then 38c, etc., is for illustrative purposes only.

Figure 4:
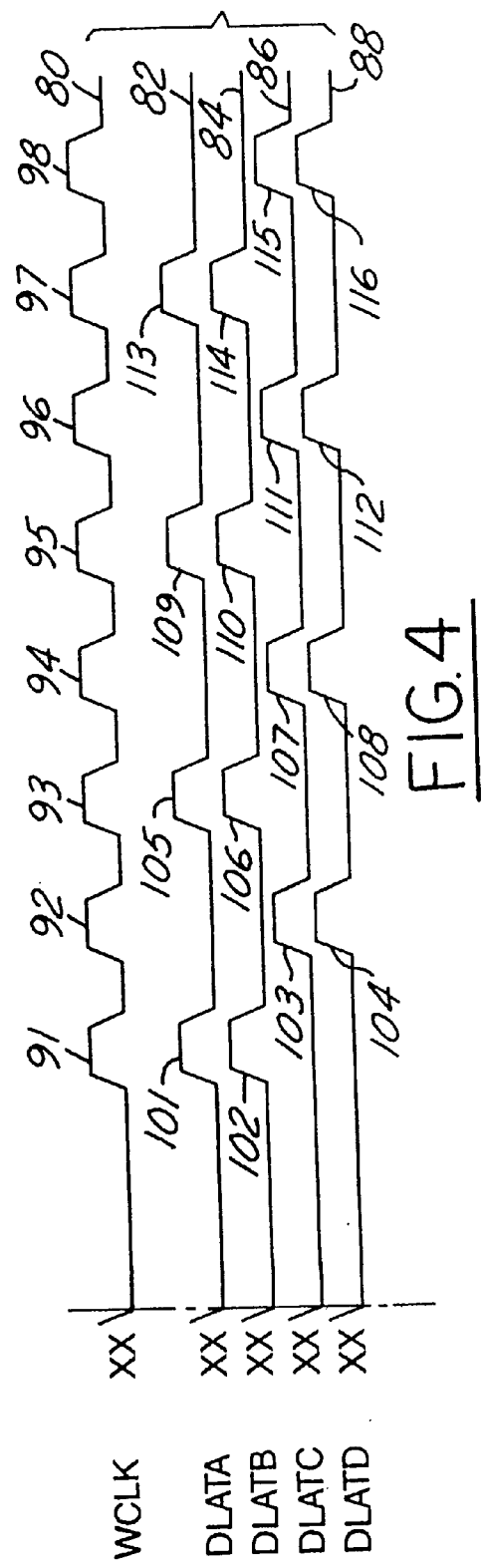
FIG. 4 is a timing diagram illustrating the implementation of the present invention using an 18-bit data word.

Referring to FIG. 4, an 18-bit data word width implementation of the present invention is illustrated. It should be appreciated that an 18-bit digital word is used for illustrative purposes. The 18-bit data word is considered a double width digital word as compared to the width of the memory arrays 38a–38d. Any multiple of the width of the memory array can be used. FIG. 4 generally comprises a Wclk clock 80, a dlatA signal 82, a dlatB signal 84, a dlatC signal 86 and a dlatD signal 88. Since the data word is 18-bits wide and the individual memory arrays 38a–38d are 9-bits wide, a slightly different loading protocol is established. The 18-bit digital word is broken into a number of fractional portions. The digital high portions of the Wclk clock 80 are shown as pulses 91, 92, 93, 94, 95, 96, 97 and 98.

When the Wclk clock 80 is high at the pulse 91, a first fraction, or half, of a 18-bit digital word is loaded into the memory array 38a and is shown as a pulse 101 on the dlatA signal 82. A second fraction, or half, of the 18-bit digital word is loaded into the memory array 36b and is shown on the dlatB signal 84 as a pulse 102. When the Wclk clock 80 is high at the pulse 92, a first fraction, or half, of the next 18-bit digital word is loaded into the memory array 36c as shown on the dlatC signal 86 as a pulse 103. The second fraction, or half, of the 18-bit digital word is loaded into the memory array 36d as shown on the dlatD signal 88 at a pulse 104. When the Wclk clock 80 is high at the pulse 93, a first fraction, or half, of the next 18-bit digital word is loaded into the memory array 36a as shown as pulse 105 of dlatA signal 82. A second fraction, or half, of the 18-bit digital word is loaded into the memory array 38b as shown by the pulse 106 on the dlatB signal 84. A series of pulses 107, 108, 109, 110, 111, 112, 113, 114, 115 and 116 show similar splitting of 18-bit digital words between either the dlatA signal 82 and dlatB signal 84 or the dlatC signal 86 and the dlatD signal 88. Each of the pulses 101–116 illustrates a 9-bit half of an 18-bit digital word loaded into one of the 9-bit wide memory arrays 38a–38d. The order in which memory arrays 38a–38d are loaded can be adjusted to fit the design criteria of a particular application by programming the decoder and multiplexers 36a–36d to respond to a timing signal that produces a non-sequential loading of the memory arrays 38a–d.

The example of the present invention illustrated in FIGS. 3 and 4 can be extended to larger or smaller width digital words. While the FIG. 4 illustration was limited to a double width digital word, a triple, quadruple or other width digital word could be accommodated by extending the plurality of fractional portions of the word accordingly. The clocking circuit 30 can be programmed to accept any multiple width digital word. The programming can be done either during production of the clocking circuit 30, after production by using an external device to program the clocking circuit 30 or by any other programming scheme contemplated. Larger or smaller width memory arrays 38a–38d could also be accommodated. Also, a larger or smaller number of memory arrays 38a–38d could be included. In any of the above modifications, the size of the counter 34 would have to be adjusted accordingly. This adjustment would be minor since the addition of a single bit to the counter 34 doubles the number of possible independent states.

It is to be understood that modifications to the invention might occur to one with skill in the field of the invention within the scope of the appended claims.

I claim:

1. A circuit for distributing data to a number of memories comprising:
a plurality of decoders each receiving: (i) an input signal comprising one or more fixed width digital words and (ii) a timing signal changing to a different value on each cycle of a clock input, at least one of said plurality of decoders presenting an output when said timing signal is present;
a timing circuit configured to provide said timing signal to said plurality of decoders; and
a plurality of memory devices for storing information, wherein each of said memory devices is configured to receive an input from one of said outputs of said plurality of decoders in an order defined by said timing signal.

2. The circuit according to claim 1 wherein each of said plurality of memory devices comprises a fixed width memory array.

3. The circuit according to claim 1 wherein each of said plurality of memory devices comprises a fixed width memory array having a width equal to the width of said fixed width digital words.

4. The circuit according to claim 1 wherein the width of each of said plurality of memory devices has a width equal to a fraction of the width of said fixed width digital words.

5. The circuit according to claim 4 wherein each of said fixed width digital words has a plurality of fractional portions, wherein each of said memory arrays receives one of more of said fractional portions.

6. The circuit according to claim 1 wherein each of said plurality of decoders receive a stream of multiple width digital words.

7. The circuit according to claim 6, further comprising a programming circuit configured to vary the width of said various sized multiple width digital words.

8. The circuit according to claim 4 wherein the width of each memory array is one half of the width of said fixed width digital words.

9. The circuit according to claim 8 wherein each of said fixed width digital words has a first half and a second half, said first half of each of said digital words is sent to one of said memory arrays and said second half of each of said digital words is sent to another one of said memory arrays.

10. The circuit according to claim 1 wherein information stored in said plurality of memory devices comprises a multiple width data word formed by a plurality of fixed width digital words.

11. The circuit according to claim 1 wherein two or more decoders form said multiple width digital word.

12. The circuit according claim 1 wherein said timing circuit comprises a number of bits and produces an independent state at each clock cycle, the number of said independent states doubling from each additional bit.

13. The circuit according to claim 4 wherein said fraction is selected from the group consisting of one half, one third and one fourth.

14. The circuit according to claim 7 further comprising an adjustment circuit configured to adjust the size of said timing circuit.

15. A circuit for distributing data to a number of memories comprising:
a plurality of decoders each receiving: (i) a timing signal changing to a different value on each cycle of a clock input and (ii) an input signal comprising a stream of fixed width digital words having a first half and a second half, at least one of said plurality of decoders presenting an output when said timing signal is present;

timing means for providing said timing signal to said plurality of decoders in response to said clock input; and a plurality of memory devices for storing information, wherein each of said memory devices receives an input from one of said output of said plurality of decoders in an order defined by said timing signal.

16. The circuit according to claim 15 wherein each of said plurality of memory devices comprises a fixed width memory array.

17. The circuit according to claim 15 wherein said plurality of memory devices comprises a memory array having a fixed width equal to the fixed width of said digital words.

18. The circuit according to claim 15 wherein each of said plurality of memory devices comprises a memory array having a fixed width equal to one half the fixed width of said fixed width digital words.

19. The circuit according to claim 18 wherein said first half of each of said digital words is presented to one of said plurality of memory devices and said second half of each of said digital words is presented to one of said plurality of memory devices.

20. The circuit according to claim 19 wherein said fixed width memory array comprises a fixed number of memory cells where said fixed number is an integer greater than one.

* * * * *